United States Patent
Khosrowpour et al.

(10) Patent No.: US 11,275,672 B2
(45) Date of Patent: Mar. 15, 2022

(54) RUN-TIME DETERMINATION OF APPLICATION PERFORMANCE WITH LOW OVERHEAD IMPACT ON SYSTEM PERFORMANCE

(71) Applicant: EMC IP Holding Company LLC, Hopkinton, MA (US)

(72) Inventors: Farzad Khosrowpour, Pflugerville, TX (US); Amihai Savir, Sansana (IL); Anat Parush Tzur, Beer Sheva (IL)

(73) Assignee: EMC IP Holding Company LLC, Hopkinton, MA (US)

(*) Notice: Subject to any disclaimer, the term of this patent is extended or adjusted under 35 U.S.C. 154(b) by 213 days.

(21) Appl. No.: 16/260,917

(22) Filed: Jan. 29, 2019

(65) Prior Publication Data
US 2020/0242000 A1 Jul. 30, 2020

(51) Int. Cl.
*G06F 9/44* (2018.01)
*G06F 11/36* (2006.01)
*G06N 20/00* (2019.01)

(52) U.S. Cl.
CPC ...... *G06F 11/3608* (2013.01); *G06F 11/3612* (2013.01); *G06N 20/00* (2019.01)

(58) Field of Classification Search
CPC .................................................. G06F 11/3608
USPC ........................................................ 717/131
See application file for complete search history.

(56) References Cited

U.S. PATENT DOCUMENTS

| 8,032,875 | B2* | 10/2011 | Kosche | G06F 8/443 717/158 |
| 10,552,289 | B2* | 2/2020 | Ilangovan | G06F 11/3409 |
| 10,601,920 | B2* | 3/2020 | Jain | H04L 67/1097 |
| 10,762,110 | B2* | 9/2020 | Greifeneder | H04L 43/04 |
| 10,944,827 | B2* | 3/2021 | Jain | H04L 67/1097 |
| 10,983,855 | B2* | 4/2021 | Darwin | G06F 11/3419 |
| 2013/0227536 | A1* | 8/2013 | Li | G06F 8/70 717/154 |
| 2016/0007218 | A1 | 1/2016 | Bhagavatula et al. | |
| 2016/0170821 | A1 | 6/2016 | Shiralkar et al. | |

(Continued)

OTHER PUBLICATIONS microsoft.com, "Cache Object," https://docs.microsoft.com/en-us/previous-versions/ms803986(v=msdn.10), Jun. 28, 2006, 6 pages.

(Continued)

*Primary Examiner* — Evral E Bodden
(74) *Attorney, Agent, or Firm* — Ryan, Mason & Lewis, LLP

(57) ABSTRACT

Techniques are disclosed for determining the run-time performance of an application executing on a computing system with low impact on the performance of the computing system. For example, a time series telemetry data stream is obtained for each of a plurality of key performance indicators during run-time execution of the application on a computing system having a given system configuration. One or more statistical features are extracted from each time series telemetry data stream. Model parameters of a machine learning performance score model are populated with values of the extracted statistical features. A run-time performance score of the application is then determined using the model parameters of the machine learning performance score model populated with the values of the extracted statistical features.

19 Claims, 6 Drawing Sheets

(56) References Cited

U.S. PATENT DOCUMENTS

| | | | |
|---|---|---|---|
| 2017/0249551 A1* | 8/2017 | Iljazi | G06F 3/0623 |
| 2018/0248904 A1 | 8/2018 | Villella et al. | |
| 2018/0285596 A1* | 10/2018 | Jones | G06F 21/552 |
| 2018/0331905 A1 | 11/2018 | Toledo et al. | |
| 2019/0012200 A1 | 1/2019 | Wilkerson et al. | |
| 2019/0019111 A1 | 1/2019 | Sun | |
| 2019/0182127 A1* | 6/2019 | Pignataro | H04L 41/0853 |

OTHER PUBLICATIONS microsoft.com, "LogicalDisk Object," https://docs.microsoft.com/en-us/previous-versions/ms803973(v=msdn.10), Jun. 28, 2006, 4 pages.

D. Van Aken et al., "Automatic Database Management System Tuning Through Large-Scale Machine Learning," Proceedings of the ACM International Conference on Management of Data (SIGMOD), May 14-19, 2017, pp. 1009-1024.

B. Zhang et al., "A Demonstration of the OtterTune Automatic Database Management System Tuning Service," Proceedings of the VLDB Endowment, Aug. 2018, pp. 1910-1913, vol. 11, No. 12.

microsoft.com, "PhysicalDisk Object," https://docs.microsoft.com/en-us/previous-versions/ms804035(v=msdn.10), Jun. 28, 2006, 4 pages.

microsoft.com, "Process Object," https://docs.microsoft.com/en-us/previous-versions/ms804621(v=msdn.10), Jun. 28, 2006, 7 pages.

microsoft.com, "System Object," https://docs.microsoft.com/en-us/previous-versions/ms804037(v=msdn.10), Jun. 28, 2006, 5 pages.

Stephen John Tarsa, "Machine Learning for Machines: Data-Driven Performance Tuning at Runtime Using Sparse Coding," Doctoral Dissertation, Harvard University, Oct. 2014, 117 pages.

\* cited by examiner

100

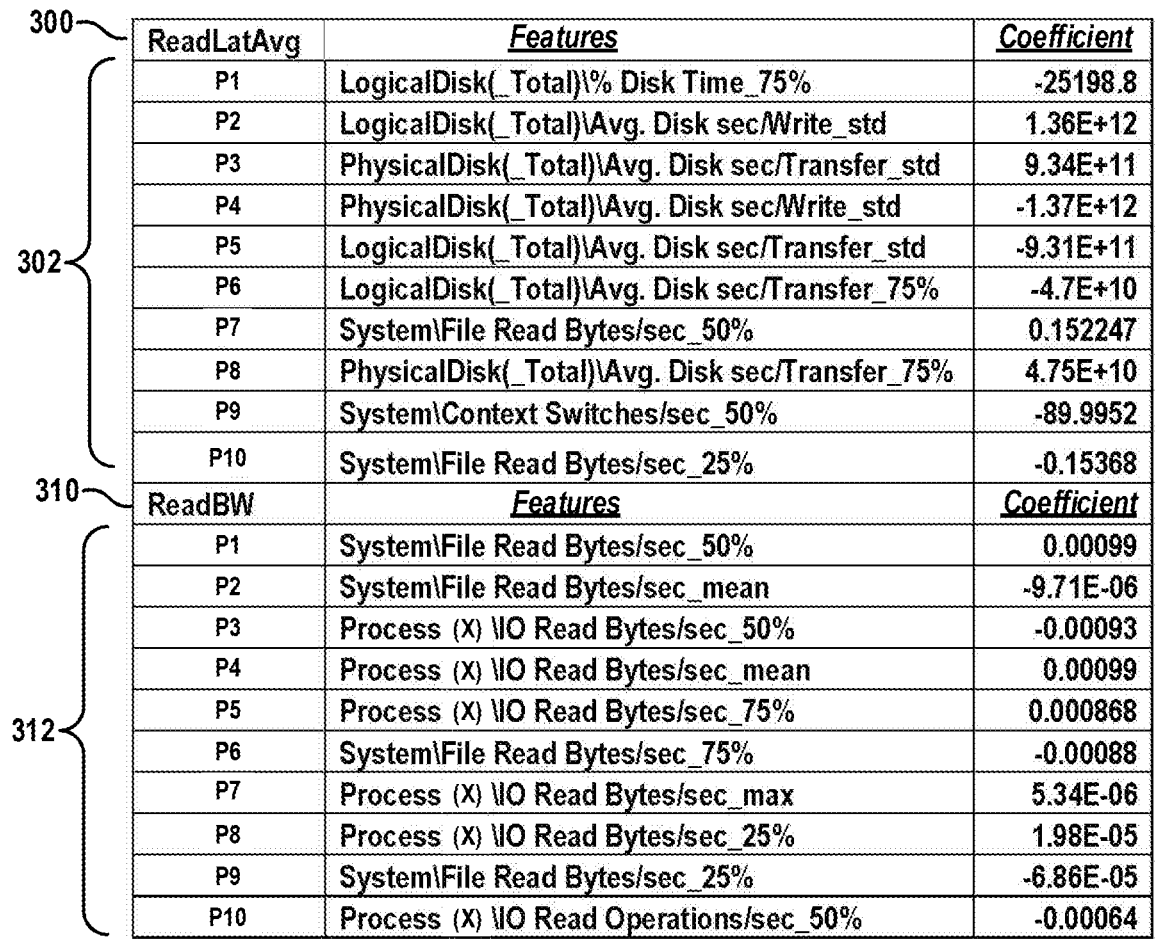

| ReadLatAvg | Features | Coefficient |
|---|---|---|
| P1 | LogicalDisk(_Total)\% Disk Time_75% | -25198.8 |
| P2 | LogicalDisk(_Total)\Avg. Disk sec/Write_std | 1.36E+12 |
| P3 | PhysicalDisk(_Total)\Avg. Disk sec/Transfer_std | 9.34E+11 |
| P4 | PhysicalDisk(_Total)\Avg. Disk sec/Write_std | -1.37E+12 |
| P5 | LogicalDisk(_Total)\Avg. Disk sec/Transfer_std | -9.31E+11 |
| P6 | LogicalDisk(_Total)\Avg. Disk sec/Transfer_75% | -4.7E+10 |
| P7 | System\File Read Bytes/sec_50% | 0.152247 |
| P8 | PhysicalDisk(_Total)\Avg. Disk sec/Transfer_75% | 4.75E+10 |
| P9 | System\Context Switches/sec_50% | -89.9952 |
| P10 | System\File Read Bytes/sec_25% | -0.15368 |
| ReadBW | Features | Coefficient |
| P1 | System\File Read Bytes/sec_50% | 0.00099 |
| P2 | System\File Read Bytes/sec_mean | -9.71E-06 |
| P3 | Process (X)\IO Read Bytes/sec_50% | -0.00093 |
| P4 | Process (X)\IO Read Bytes/sec_mean | 0.00099 |
| P5 | Process (X)\IO Read Bytes/sec_75% | 0.000868 |
| P6 | System\File Read Bytes/sec_75% | -0.00088 |
| P7 | Process (X)\IO Read Bytes/sec_max | 5.34E-06 |
| P8 | Process (X)\IO Read Bytes/sec_25% | 1.98E-05 |
| P9 | System\File Read Bytes/sec_25% | -6.86E-05 |
| P10 | Process (X)\IO Read Operations/sec_50% | -0.00064 |

FIG. 3A

| WriteIOPS | Features | Coefficient |
|---|---|---|
| P1 | System\File Data Operations/sec_75% | -0.23507 |
| P2 | System\File Data Operations/sec_25% | 0.110803 |
| P3 | System\File Write Operations/sec_50% | 0.060986 |
| P4 | System\System Calls/sec_25% | 0.031604 |
| P5 | System\File Write Operations/sec_mean | 1.131512 |
| P6 | Process (X) \IO Data Operations/sec_mean | -0.05654 |
| P7 | Process (X) \IO Data Operations/sec_75% | 0.288518 |
| P8 | Process (X) \IO Write Operations/sec_25% | -0.20186 |
| P9 | System\System Calls/sec_50% | -0.03234 |
| P10 | System\File Data Operations/sec_mean | -0.09694 |
| WriteBW | Features | Coefficient |
| P1 | Process (X) \IO Write Bytes/sec_50% | -0.00021 |
| P2 | Process (X) \IO Write Bytes/sec_mean | -0.00048 |
| P3 | System\File Write Bytes/sec_25% | -0.00258 |
| P4 | System\File Write Bytes/sec_75% | -0.00149 |
| P5 | System\File Write Bytes/sec_mean | 0.001489 |
| P6 | System\File Write Bytes/sec_50% | 0.000229 |
| P7 | Process (X) \IO Write Bytes/sec_75% | 0.001499 |
| P8 | Process (X) \IO Data Bytes/sec_mean | -1.49E-05 |
| P9 | Process (X) \IO Data Bytes/sec_25% | 2.08E-05 |
| P10 | Process (X) \IO Write Bytes/sec_25% | 0.002517 |

FIG. 3B

| ReadIOPS | Features | Coefficient |
|---|---|---|
| P1 | System\File Read Operations/sec_mean | 0.081172 |
| P2 | System\File Read Operations/sec_50% | -0.75417 |
| P3 | Process (X) \IO Read Operations/sec_mean | 0.924046 |
| P4 | Process (X) \IO Read Operations/sec_50% | 0.736033 |
| P5 | System\File Read Operations/sec_25% | 0.06484 |
| P6 | Process (X) \IO Read Operations/sec_75% | -0.44163 |
| P7 | System\File Read Operations/sec_75% | 0.485546 |
| P8 | Process (X) \IO Read Operations/sec_25% | -0.0973 |
| P9 | Cache\Async Copy Reads/sec_50% | 0.085974 |
| P10 | Cache\Async Copy Reads/sec_75% | -0.08395 |
| WriteLatAvg | Features | Coefficient |
| P1 | LogicalDisk(_Total)\% Disk Time_75% | -10319.4 |
| P2 | LogicalDisk(_Total)\Avg. Disk sec/Write_std | 2.40E+12 |
| P3 | PhysicalDisk(_Total)\Avg. Disk sec/Transfer_75% | 5.74E+09 |
| P4 | PhysicalDisk(_Total)\Avg. Disk sec/Transfer_std | 1.62E+12 |
| P5 | LogicalDisk(_Total)\Avg. Disk sec/Transfer_std | -1.62E+12 |
| P6 | PhysicalDisk(_Total)\Avg. Disk sec/Write_std | -2.40E+12 |
| P7 | LogicalDisk(_Total)\Avg. Disk sec/Write_75% | 3.18E+11 |
| P8 | PhysicalDisk(_Total)\Avg. Disk sec/Write_mean | -5.7E+09 |
| P9 | LogicalDisk(_Total)\Avg. Disk sec/Transfer_75% | -3E+09 |
| P10 | PhysicalDisk(_Total)\Avg. Disk sec/Write_75% | -3.15E+11 |

FIG. 3C

RUN-TIME DETERMINATION OF APPLICATION PERFORMANCE WITH LOW OVERHEAD IMPACT ON SYSTEM PERFORMANCE

FIELD

The field relates generally to techniques for determining run-time performance of applications executing on a computing system.

BACKGROUND

Today, most computing systems (e.g., computers) can be configured using configuration "knobs" that control various aspects of the computing systems such as, e.g., the amount of memory to utilize for caches, how often data is written to storage, etc. The configuration knob settings for a given computing system can have a significant effect on the run-time behavior of a given workload (e.g., application) being executed by the computing system. In this regard, various tools and techniques have been developed to determine the configuration knob settings that will optimize the performance of a given application. For example, one conventional technique involves utilizing a benchmark application to test the run-time behavior of a specific application or workload for which the benchmark application is created. However, the use of benchmark applications for run-time performance testing of workloads is problematic for various reasons.

For example, a benchmark application is compute intensive and adversely impacts machine performance during execution of the benchmark application on the machine. During execution of the benchmarking process, the target application being tested cannot be utilized by an end user. In addition, the execution of the benchmark application can adversely impact the performance of other processes or applications that the end user is currently running on the given machine. In this regard, end users or customers typically will not allow performance optimization tools to perform background benchmark testing procedures that consume a significant amount of compute power and storage bandwidth, which limits the ability of the performance optimization tools to measure run-time performance of the machine on a continual basis. Another disadvantage associated with using conventional benchmarking applications for performance optimization is that each benchmarking application is custom designed to measure the run-time performance of a specific application. There is no standard benchmark application (e.g., no application agnostic benchmark application) which can be commonly utilized to determine performance for different types of applications, as each benchmark application is custom designed to run specific test procedures for a specific application.

SUMMARY

Embodiments of the invention include methods for determining the run-time performance of an application executing on a computing system with low impact on the performance of the computing system. For example, in one embodiment, a time series telemetry data stream is obtained for each of a plurality of key performance indicators during run-time execution of the application on a computing system having a given system configuration. One or more statistical features are extracted from each time series telemetry data stream. Model parameters of a machine learning performance score model are populated with values of the extracted statistical features. A run-time performance score of the application is then determined using the model parameters of the machine learning performance score model populated with the values of the extracted statistical features.

Other embodiments of the invention include, without limitation, computing systems and articles of manufacture comprising processor-readable storage media for determining the run-time performance of an application executing on a computing system with low impact on the performance of the computing system.

BRIEF DESCRIPTION OF THE DRAWINGS

FIGS. 3A, 3B, and 3C illustrate model parameters of agnostic machine learning models that are used for run-time determination of storage performance metrics, according to exemplary embodiments of the invention.

DETAILED DESCRIPTION

Figure 1:
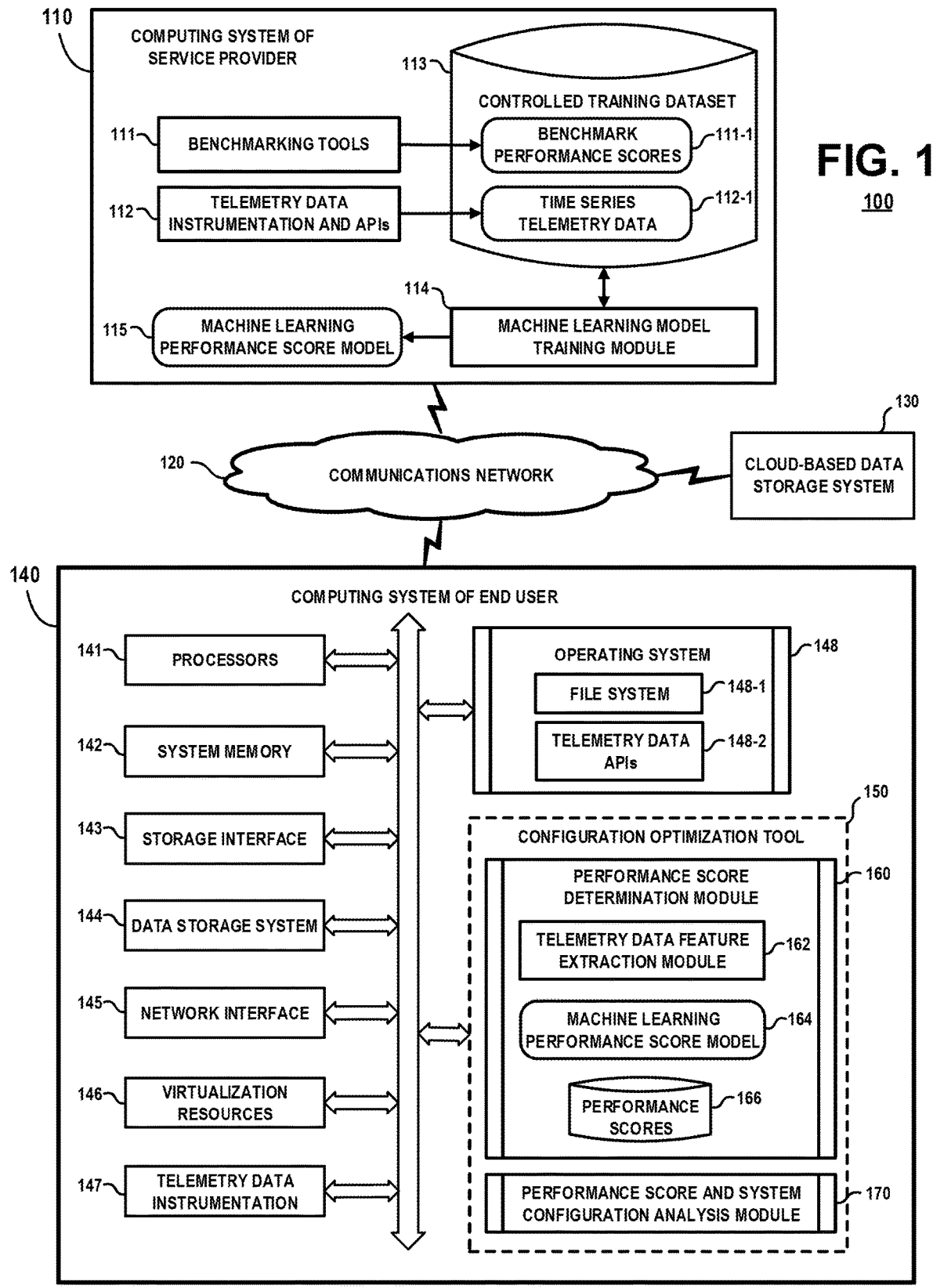
FIG. 1 schematically illustrates a system for determining the run-time performance of an application executing on a computing system, according to an embodiment of the invention.

Embodiments of the invention will be described herein with regard to systems and methods for determining the run-time performance of an application executing on a computing system with low impact on the performance of the computing system. For example, FIG. 1 schematically illustrates a system 100 for determining the run-time performance of an application executing on a computing system, according to an embodiment of the invention. In particular, the system 100 comprises a service provider computing system 110, a communications network 120, a cloud-based storage system 130, and an end user computing system 140. The service provider computing system 110 comprises benchmarking tools 111, telemetry data instrumentation and application programming interfaces (APIs) 112, a database of training data 113, and a machine learning model training module 114. The database of training data 113 comprises a controlled dataset of labeled training data comprising benchmark performance 111-1 and time series telemetry data 112-1. The machine learning model training module 114 utilizes the controlled dataset of labeled training data 111-1 and 112-1 in the database 113 to generate a machine learning performance score model 115, using methods as discussed in further detail below.

The end user computing system 140 (e.g., computer) comprises processors 141, system memory 142, a storage interface 143, a data storage system 144, a network interface 145, virtualization resources 146, telemetry data instrumentation 147, an operating system 148, and a configuration optimization tool 150. The operating system 148 comprises, for example, a file system 148-1 and telemetry data APIs 148-2. The configuration optimization tool 150 comprises a performance score determination module 160 and a performance score and system configuration analysis module 170. The performance score determination module 160 comprises a telemetry data feature extraction module 162, a machine learning performance score model 164, and a database of performance scores 166.

The end user computing system 140 can access the service provider computing system 110 and the cloud-based storage system 130 over the communications network 120. The communications network 120 may comprise, for example, a global computer network (e.g., the Internet), a wide area network (WAN), a local area network (LAN), a satellite network, a telephone or cable network, a cellular network, a wireless network such as Wi-Fi (Wireless Fidelity) or WiMAX (Worldwide Interoperability for Microwave Access), or various portions or combinations of these and other types of networks. The term "network" as used herein is therefore intended to be broadly construed so as to encompass a wide variety of different network arrangements, including combinations of multiple networks possibly of different types. The cloud-based data storage system 130 comprises one or more remote data storage sites that are managed by one or more hosting companies to provide cloud-based storage services to remotely store user data.

The service provider computing system 110 is utilized by the service provider to perform offline processing to develop and periodically update the machine learning performance score model 115. The machine learning performance score model 115 is downloaded to the end user computing system 140 and utilized by the configuration optimization tool 150 to determine the run-time performance of an application executing on the end user computing system 140. The service provider performs a series of controlled experiments to collect the controlled dataset of training data which is stored in the database of training data 113 and utilized by the machine learning model training module 114 for training the machine learning performance score model 115. For example, in one exemplary embodiment, the benchmarking tools 111 are utilized to collect training data which comprises the benchmark performance scores 111-1, and the telemetry data instrumentation and APIs 112 are utilized to collect training data which comprises the time series telemetry data 112-1 for various key performance indicators (KPIs). The corpus of benchmark performance scores 111-1 and time series telemetry data 112-1 comprises a large and diverse set of training data that provides information regarding the performance of various types of applications executing on a wide variety of different machines (e.g., different types of computers with different operating systems, storage resources, processor resources, memory resources, graphics resources, etc.), as well as the various types of applications executing on the same machine with different configurations of the machine resources such as storage resources, processor resources, memory resources, graphics resources, etc.

In particular, in one exemplary embodiment, the benchmarking tools 111 comprise benchmark applications that are utilized to perform multiple run-time tests on applications to measure and score the performance of such applications for various key performance indicators, and store the results as labeled benchmark performance scores 111-1 in the database of training data 113. The benchmark performance scores 111-1 can be collected for different aspects of a given machine configuration including, e.g., storage performance, CPU (central processing unit) performance, memory performance, graphics performance, etc. In one exemplary embodiment, in the context of end-to-end storage performance, the benchmarking tools 111 are utilized to perform storage benchmarking tests to obtain storage performance scores with regard to storage performance metrics such as input/output (IO) operations per second (IOPS), bandwidth, and latency.

The benchmarking tools 111 comprise custom benchmark applications that are specifically designed for the applications being tested. For example, while there are various types of computer-aided design (CAD) applications (e.g., AutoCAD, Solidworks, 3Dmax, etc.) each CAD application will have a custom benchmark application specifically designed for the given CAD application. A given benchmark application will execute on the same machine as a given application to perform various tests on the given application and determine performance scores for different run-time behaviors of the given application executing on the given machine with a given configuration.

The telemetry data instrumentation and APIs 112 include, for example KPI application programming interfaces of a native operating system, dedicated telemetry data instrumentation, telemetry data that is captured and reported by hardware components, etc. In particular, as is known in the art, operating systems such as Windows and Linux include performance counters that can be configured and utilized to measure various parameters associated with executing processes for the purpose of monitoring system performance. In addition, telemetry data can be acquired using dedicated software instrumentation tools to monitor and measure various parameters and metrics with regard to system performance during the run-time execution of workloads. Further, hardware components and associated hardware drivers typically include performance counters that collect statistics regarding device-level operation. In some embodiments, the time series telemetry data 112-1 is collected for a given application concurrently with performing the benchmark testing of the given application to collect benchmark performance scores 111-1 for the given application.

The machine learning model training module 114 is configured to extract statistical features from the training corpus of time series telemetry data 112-1 and utilize the extracted statistical features of the time series telemetry data 112-1 together with the training corpus of benchmark performance scores 111-1 to train parameters of the machine learning performance score model 115. More specifically, in an exemplary embodiment, the machine learning model training module 114 comprises a feature extraction module that is configured to process the time series telemetry data 112-1 and extract a set of statistical features from the time series telemetry data 112-1 for each KPI that is measured. For example, in some embodiments, as explained in further detail below, the statistical features that are extracted from the time series telemetry data for each KPI comprise various descriptive statistics or summary statistics such as, e.g., mean, standard deviation, variance, etc.

The machine learning model training module 114 comprises methods that are configured to train the machine learning performance score model 115 using, for example, any suitable statistical analysis technique to determine the magnitude of the relationship between the extracted features of the KPI time series telemetry data streams and the target storage performance metrics (e.g., IOPS, read/write bandwidth, read/write latency, etc.). In addition, the machine learning model training module 114 utilizes such relationship information to learn a set of features (e.g., select a subset of features from the training data) that can be utilized as model parameters of an agnostic machine learning performance score model which is configured to predict performance scores for the target storage performance metrics over various types of workloads and system configurations.

While the time series telemetry data 112-1 can include data collected for hundreds (e.g., 300 or more) KPIs, the model training process is configured to determine which types of KPI telemetry data are most relevant for use in building a performance score model that can predict a set of target performance metrics for a given functionality, e.g., predict read/write latency, read/write bandwidth, and IOPS performance scores for determining end-to-end storage performance of an application executing on a machine. Various techniques according to embodiments of the invention for obtaining and utilizing a controlled training dataset 111-1 and 112-1 to train the machine learning performance score model 115 will be described in further detail below in conjunction with FIGS. 2, 3A, 3B, and 3C.

The service provider computing system 110 will periodically download (e.g., push) a most current version of the machine learning performance score model 115 to the end user computing system 140 for use by the configuration optimization tool 150. As illustrated in FIG. 1, the machine learning performance score module 164 on the end user computing system 140 represents a previously downloaded version of the machine learning performance score model 115 as generated and provided by the service provider. The configuration optimization tool 150 utilizes the machine learning performance score module 164 to determine run-time performance scores (e.g., end-to-end storage performance scores) of an application executing on the end user computing system 140. In addition, the configuration optimization tool 150 utilizes the run-time performance scores to automatically optimize the configuration of the computing system 140 or otherwise provide smart recommendations to the end user for modifying the configuration of the computing system 140 to alter the run-time performance of the application executing on the computing system 140 with regard to, e.g., storage performance, and achieve an increased level or optimal level of run-time performance of the application.

More specifically, during run-time execution of a given application on the computing system 140, the telemetry data instrumentation 147 and/or telemetry APIs 148-2 of the operating system 148 (e.g., performance counters) will generate time series telemetry data for various KPIs related to resource utilization of the computing system 140, e.g., storage utilization, CPU utilization, memory utilization, graphics utilization, virtual resource utilization, etc. The performance score determination module 160 processes the KPI time series telemetry data for a given set of KPIs to determine one or more run-time performance scores for the given application executing on the computing system 140. While the telemetry data instrumentation 147 and/or telemetry APIs 148-2 will generate time series telemetry data for various KPIs (e.g., hundreds of KPIs), the performance score determination module 160 will utilize a predefined subset of the KPI telemetry data on which the machine learning performance score model 164 was trained. For example, in the context of storage performance, the performance score determination module 160 will acquire and store the KPI telemetry data which is deemed relevant for predicting read/write latency, read/write bandwidth, IOPS, etc., using the machine learning performance score module 164.

The telemetry data feature extraction module 162 implements methods as discussed herein to extract statistical features (e.g., summary statistics) from the time series telemetry data for each of the KPIs within the predefined subset of KPIs. The performance score determination module 160 applies the extracted features to the machine learning performance score module 164 to compute one or more performance scores for the running application. The performance score(s) for the given application are persistently stored in the database of performance scores 166, wherein the determined performance score(s) for the given application are mapped to the current configuration of the computing system 140. Details regarding operating modes of the configuration optimization tool 150 according to exemplary embodiments of the invention will be discussed in further detail below in conjunction with FIG. 4.

Over time, the performance score determination module 160 can determine and store run-time performance scores for a given application for different system configuration settings of the computing system 140. In this regard, the database of performance scores 166 can persistently maintain a vast amount of run-time performance score data and associated system configuration settings information for each of a plurality of applications that execute on the computing system 140. The performance score and system configuration analysis module 170 implements methods for processing the information contained in the database of performance scores 166 to determine an optimal system configuration for a given application.

For example, in an exemplary embodiment, the performance score and system configuration analysis module 170 is configured to compare the different sets of performance scores and associated system configurations in the database 166 for a given application to identify one or more optimal system configurations which have been previously determined to achieve the highest run-time performance scores for the given application. In one embodiment, when a given application is launched on the computing system 140, the performance score and system configuration analysis module 170 can utilize the performance score information contained in the database of performance scores 166 to automatically determine a target system configuration which achieves the highest run-time performance score for the given application, and then automatically adjust one or more resource configuration settings of the computing system 140 to obtain the target system configuration and, thus, increase or optimize the run-time performance of the application executing on the computing system 140.

In this regard, in the context of end-to-end storage performance of a given application, the performance score and system configuration analysis module 170 can characterize the before and after run-time storage performance that is achieved for the given application based on configuration changes of the computing system 140. For example, given an application and two different system configurations and associated run-time performance scores, the performance score and system configuration analysis module 170 can be configured to determine a score or measure which indicates an increase or decrease in the run-time storage performance of the given application that is obtained from switching between the two different system configurations.

In another exemplary embodiment, the performance score and system configuration analysis module 170 is configured to provide smart recommendations to an end user for modifying one or more system configuration settings of the computing system 140 to alter the run-time performance of the given application executing on the computing system 140 and achieve an increased level or optimal level of run-time performance of the application. For example, the end user can issue a query to the configuration optimization tool 150 to request information regarding system configuration settings that would achieve an optimal run-time performance of a given application which the end user intends to execute on the computing system 140, allowing the user to either manually adjust one or more system resource configuration settings or otherwise command the performance score and system configuration analysis module 170 to optimize the system configuration based on the smart recommendations provided by the performance score and system configuration analysis module 170.

In another exemplary embodiment, during run-time execution of a given application, the performance score and system configuration analysis module 170 can be configured to analyze or otherwise compare current run-time performance scores (which are determined for the given application for a current system configuration of the computing system 140) against previously determined run-time performance scores of the given application for different system configurations (as contained in the database of performance scores 166) and then based on the results of such analysis/comparison, automatically determine whether to (i) maintain the current system configuration for the given application or (ii) adjust one or more resource configuration settings to alter the run-time performance of the application executing on the computing system 140 and achieve an increased level or optimal level of run-time performance of the application. In this instance, the performance score and system configuration analysis module 170 can be configured to automatically adjust one or more system resource configuration settings to optimize the run-time performance of the application, or otherwise prompt the user with a notification to recommend adjustments that can be made to one or more system resource configurations setting to enhance the run-time performance of the given application.

As shown in FIG. 1, the system configuration of the end user computing system 140 is based on the types of resources used and the resource configuration settings for, e.g., the processors 141, the system memory 142, the storage interface 143, the data storage system 144, the network interface 145, the virtualization resources 146, and the file system 148-1. In particular, the processors 141 comprise one or more types of hardware processors that are configured to process program instructions and data to execute the native operating system 148 and applications that run on the computing system 140. For example, the processors 141 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The system memory 142 comprises various types of memory such as volatile random-access memory (RAM), non-volatile random-access memory (NVRAM), or other types of memory, in any combination. The term "memory" or "system memory" as used herein refers to volatile and/or non-volatile memory which is utilized to store application program instructions that are read and processed by the processors 141 to execute the native operating system 148 and other applications on the computing system 140, and to temporarily store data that is utilized and/or generated by the native operating system 148 and application programs running on the computing system 140. For example, the volatile memory may be a dynamic random-access memory (DRAM) (e.g., DRAM DIMM (Dual In-line Memory Module), or other forms of volatile RAM. The system memory may comprise non-volatile memory that is configured and accessible as a memory resource. For example, the non-volatile system memory may be one or more of a NAND Flash storage device, an SSD device, or other types of next generation non-volatile memory (NGNVM) devices.

In addition, the system memory 142 is utilized for configuring cache memory. The configuration of the cache memory can have a significant impact on the storage performance of a running application. For example, the parameters and operating modes of the cache memory of the computing system 140, e.g., cache size, write-through mode, write-back mode, etc., can be configured to optimize application performance.

The storage interface 143 enables the processors 141 to interface and communicate with the system memory 142, and other local storage and off-infrastructure storage media (e.g., data storage system 144), using one or more standard communication and/or storage control protocols to read data from or write data to volatile and non-volatile memory/storage devices. Such protocols include, but are not limited to, Non-Volatile Memory Express (NVMe), Peripheral Component Interconnect Express (PCIe), Parallel Advanced Technology Attachment (PATA), Serial ATA (SATA), Serial Attached SCSI Small Computer System Interface) (SAS), Fibre Channel, etc.

The data storage system 144 may comprise any type of storage system that is used for persistent storage of data. For example, the data storage system 144 may include storage devices such as hard disk drives (HDDs), flash memory devices, solid-state drive (SSD) devices, etc. The data storage system 144 may be direct-attached storage (DAS), network attached storage (NAS), etc.

The network interface 145 enables the computing system 140 to interface and communicate with a network and other system components (e.g., could-based data storage system 130). For example, the network interface 145 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, input/output (I/O) adaptors, converged Ethernet adaptors, etc.) to support communication protocols and interfaces including, but not limited to, PCIe, direct memory access (DMA) and remote direct memory access (RDMA) data transfer protocols, etc.

The file system 148-1 of the operating system 148 comprises a process that manages the storage and organization of data that is stored on storage media (e.g., HDDs, SSDs, etc.,) of the data storage system 144 and the cloud-based data storage system 130. The type of file system configuration (e.g. File Allocation Table (FAT) file system) that is utilized by the operating system 148 can affect the storage performance of running applications. The storage of the cloud-based data storage system 130 (which is utilized by the computing system 140) will appear as volumes in the file system 148-1 of the operating system 148. In this regard, since the cloud-based data storage system 130 and the network interface 145 are components of an end-to-end storage I/O path, the use of the cloud-based data storage system 130 and the configuration of the network interface 145 for accessing the cloud-based data storage system 130 can have an impact on the end-to-end storage performance of a given application executing on the computing system 140.

The virtualization resources 146 can be instantiated to execute one or more applications or functions which are hosted by the computing system 140. For example, the virtualization resources 146 can be configured to implement the various modules and functionalities of the configuration optimization tool 150 or other applications that execute on the computing system 140 for which run-time performance scores are determined using the configuration optimization tool 150. In one embodiment, the virtualization resources 146 comprise virtual machines that are implemented using a hypervisor platform which executes on the computing system 140, wherein one or more virtual machines can be instantiated to execute functions of the computing system 140. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the computing system 140, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 146 comprise containers such as Docker containers or other types of Linux containers (LXCs). As is known in the art, in a container-based application framework, each application container comprises a separate application and associated dependencies and other components to provide a complete file system, but shares the kernel functions of the host operating system 148 with the other application containers. Each application container executes as an isolated process in user space of the host operating system 148. In particular, a container system utilizes the underlying operating system 148 that provides the basic services to all containerized applications using virtual-memory support for isolation. One or more containers can be instantiated to execute one or more applications or functions of the computing system 140 and the configuration optimization tool 150. In yet another embodiment, containers may be used in combination with other virtualization infrastructure such as virtual machines implemented using a hypervisor, wherein Docker containers or other types of LXCs are configured to run on virtual machines in a multi-tenant environment.

In one embodiment, the configuration optimization tool 150 comprises software that is persistently stored in the local storage resources (e.g., data storage system 144) and loaded into the system memory 142, and executed by the processors 141 to perform respective functions as described herein. In this regard, the system memory 142, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

Figure 2:
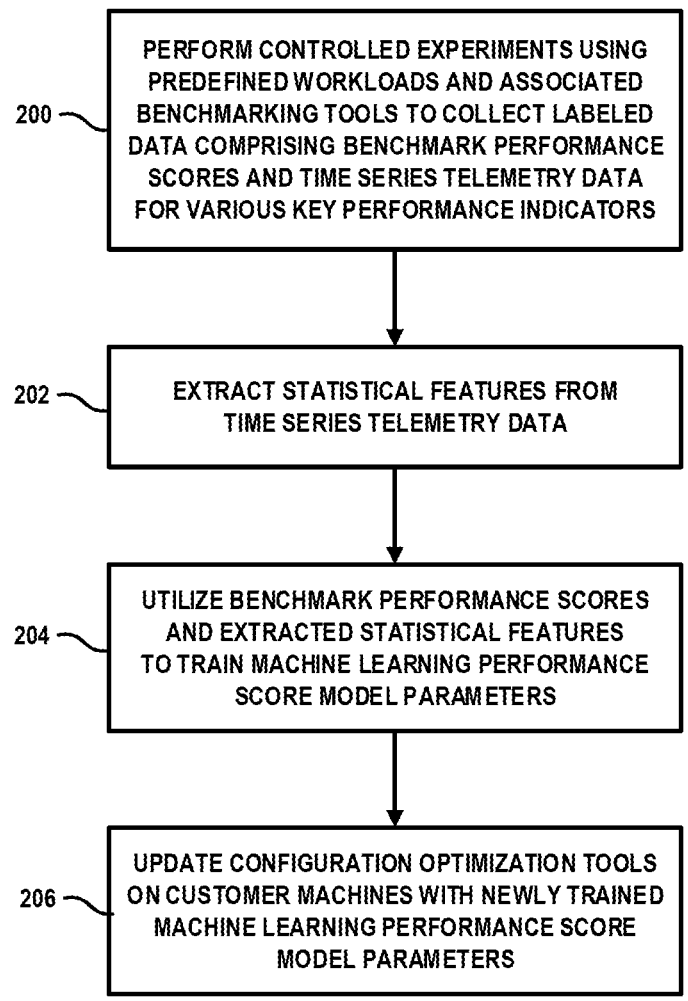
FIG. 2 is a flow diagram of a method for training an agnostic machine learning performance score model which is utilized for determining the run-time performance of applications, according to an embodiment of the invention.

FIG. 2 is a flow diagram of a method for training an agnostic machine learning performance score model which is utilized for determining the run-time performance of applications, according to an embodiment of the invention. In particular, in one exemplary embodiment, FIG. 2 illustrates offline processing that is performed by a service provider using the computing system 110 of FIG. 1 to develop the machine learning performance score model 115. As noted above, the service provider will perform a series of controlled experiments to collect the training data that is used for training the machine learning performance score model 115. In particular, in one exemplary embodiment, the offline processing comprises performing a series of controlled experiments using predefined workloads (e.g., applications) and associated benchmarking tools to collect labeled data which comprises (i) benchmark performance scores and (ii) time series telemetry data for various key performance indicators (block 200). The controlled experiments are performed to collect a large amount of data for various types of machines, machine configurations, and workloads (e.g., applications). While the various techniques discussed herein can be utilized to determine the run-time performance of an application with respect to various functionalities, for illustrative purposes, exemplary embodiments of the invention will be discussed in the context of methods for determining the run-time end-to-end storage performance of applications for different configurations of computing systems which execute the applications.

More specifically, in the context of modeling end-to-end storage performance of applications, the benchmarking tools 111 are utilized to perform benchmark tests on a wide range of different types of applications to test, e.g., the run-time end-to-end storage performance of the applications executing on a wide range of different types of machines (e.g., personal computers, server computers, etc.) and different configurations (e.g., different types and configurations of caches, storage devices, storage controllers, storage interfaces, etc.) to collect a controlled dataset of benchmark performance scores 111-1. For example, in one exemplary embodiment, in the context of end-to-end storage performance, the benchmarking tools 111 are utilized to perform storage benchmarking tests to obtain storage performance scores with regard to storage performance metrics such as IOPS, read bandwidth, write bandwidth, read latency, write latency, etc.

The IOPS metric is a storage performance measurement that denotes an amount of read or write operations that can be performed in one second of time by a storage device or storage system such as hard disk drives (HDDs, solid-state drives (SSDs), and other types of storage devices or systems (e.g., RAID storage system), etc. The bandwidth metric is a storage performance measurement with regard to how much throughput (e.g., megabytes/second (MB/s) a certain storage system/device can provide. While a given storage device (e.g., HDD) can provide a maximum throughput value, there are various factors which limit the ability to achieve the maximum throughput value during real-time operations. Depending on the operating system and the application/service that needs disk access, it will issue a request to read or write a certain amount of data at the same time, which is referred to as IO size. The IO size could be, e.g., 4 KB (kilobytes), 8 KB, 32 KB, etc. The average IO size×(IOPS) =throughput in MB/s.

The latency metric is a storage performance measurement that denotes an amount of time that it takes a storage device or system to complete an operation. In particular, each I/O request will take some average time to complete (e.g., average latency), which is measured in milliseconds (ms). An unduly high amount of storage latency for a given storage system has a direct and immediate impact on workloads running on that storage system. There are various factors which affect storage latency, some which are physical limits due to the mechanical constructs of, e.g., a standard hard disk. Latency takes into consideration factors such as, e.g., (i) an amount of time it takes a disk to spin around to a target location on the disk, (ii) the amount of time it takes for the system to read or write the data from or to the disk, (iii) the amount of time it takes to transfer the data over a storage interface link, etc.

In addition, the controlled experiments are performed to acquire and record time series telemetry data for various KPIs (e.g., hundreds of KPIs). For example, in the context of end-to-end storage performance, the time series telemetry data is acquired for various KPIs which provide information regarding the performances and behaviors of various components, interfaces, etc., in the end-to-end storage I/O path of the entire storage I/O stack. For example, the storage I/O stack includes storage devices (e.g., HDDs, SSDs, etc.), drivers, hardware interfaces for connecting host to storage (e.g., SATA, SAS, etc.), host cache memory, file system, access to cloud-based storage, etc.

As noted above, in the exemplary system embodiment of FIG. 1, the time series telemetry data is collected using the telemetry data instrumentation and APIs 112 and stored as time-stamped telemetry data 112-1 in the database of training data 113. In some embodiments, the time series telemetry data 112-1 is collected for the same workloads that are executed by the benchmarking tools 111 when determining the benchmark performance scores 111-1. In other words, the telemetry data 112-1 is collected concurrently with the data that is collected and processed by the benchmarking tools 111 to compute the benchmark performance scores 111-1. In this regard, the training data provides correspondence or correlation between the collected KPI telemetry data 112-1 and the benchmark performance scores 111-1 for various performance metrics (e.g., IOPS, bandwidth, and latency) as determined by the benchmarking tools 111, when executing the same workloads. This allows the benchmark performance scores 111-1 for the given performance metrics (e.g., IOPS, bandwidth, and latency) to be utilized as a reference (e.g., for purposes of comparison) with regard the same performance metrics as may be separately determined using the KPI telemetry data 112-1.

Referring again to FIG. 2, following the acquisition of the training corpus, a next stage of the machine learning model training process flow comprises extracting statistical features from the time series telemetry data (block 202). In particular, in one embodiment of the invention, the KPI telemetry data 112-1 is processed using a feature extraction process to extract a set of statistical features from each KPI telemetry data stream. For example, in one embodiment the statistical features for a given KPI telemetry data stream are extracted by computing various summary statistics from the data sample values of the time series telemetry data stream, wherein the summary statistics include, for example: (i) mean, (ii) standard deviation (std), (iii) minimum (Min), (iv) maximum (Max), (v) $25^{th}$ percentile, (vi) $50^{th}$ percentile, and (vii) $75^{th}$ percentile.

In particular, the mean is computed as the average of all data values of the given KPI time series telemetry data stream. The standard deviation of the data values $V_i$ (for i=1, . . . , N) of the given KPI time series telemetry data stream comprising N data values is computed as:

$$\sigma = \sqrt{\frac{1}{N}\Sigma_i^N (V_i - \mu)^2},$$

where μ denotes a mean (or average) of all the data values $V_i$ of the given KPI time series telemetry data stream.

Further, the percentile is a measure which indicates a data value below which a given percentage of data values in the given KPI time series telemetry data stream falls. For example, the $25^{th}$ percentile is the data value below which 25% of the data values of the given KPI time series telemetry data stream may be found. The Min and the Max features denote the data values have the smallest value and the largest value, respectively, in the given KPI time series telemetry data stream.

Furthermore, for each KPI time series telemetry data stream (e.g., $V_1, V_2, V_3, \ldots, V_{N-1}, V_N$), a KPI time series delta (Δ) stream is calculated as: $\Delta=[(V_2-V_1), (V_3-V_2), \ldots (V_N-V_{N-1})]$. In addition, each KPI time series delta (Δ) stream is characterized by computing the statistical values of (i) mean, (ii) standard deviation (SD), (iii) minimum (Min), (iv) maximum (Max), (v) $25^{th}$ percentile, (vi) $50^{th}$ percentile, and (vii) $75^{th}$ percentile, as noted above. In this regard, in one exemplary embodiment, fourteen (14) features are extracted for each KPI time series telemetry data stream. The KPI time series delta data streams and associated extracted features provide additional information that enables the machine learning process to understand other behaviors of the time series data, e.g., how noisy the data samples are.

Next, the training process continues by utilizing the training corpus of benchmark performance scores and the extracted statistical features of the KPI time series telemetry data streams to train the parameters of a machine learning performance score model (block 204). The model training process is performed using any suitable statistical analysis technique to determine the magnitude of the relationship between the extracted features of the KPI time series telemetry data streams and the target storage performance metrics (e.g., IOPS, bandwidth, latency), and utilize such relationship information to learn a set of features (e.g. select a subset of features from the training data) that can be utilized as model parameters of an agnostic machine learning performance score model which is configured to predict performance scores for the target storage performance metrics over various types of workloads and system configurations. In other words, the model training process results in a model which learns a function $f$ such that $f(x)$ maps to y, wherein x denotes the features (independent variables) that are used to predict y, and wherein y denotes a target performance metric (dependent variable).

In one exemplary embodiment, the dependencies/relationships between the extracted features of the KPI time series telemetry data streams and the target storage performance metrics (e.g., IOPS, bandwidth, latency) are modeled using a linear regression function whose weights are estimated from the training data. For example, as is well-known to those of ordinary skill in the art, linear regression comprises a supervised machine learning process where a predicted output is continuous and has a constant slope. For example, linear regression implements standard slope-intercept form: y=mx+b, where y denotes a predicted value, where x denotes an actual value (e.g., extracted feature from telemetry data), where m denotes a weight (e.g., coefficient), and where b denotes a bias. The machine learning model training process is performed to build a linear regression function between the features of the KPI time series telemetry data and the target performance metrics (e.g., IOPS, bandwidth, latency, etc.), which can serve as a model that can accurately predict storage performance scores for a workload during run-time execution of the workload using a set of extracted features of telemetry data that is captured during run-time execution of the workload.

The model training process is performed to learn the parameters that can be used to compute performance scores for a plurality of target storage performance metrics (e.g., IOPS, bandwidth, latency) given a set of features (x) extracted from time series telemetry data of a given application during run-time of the application. There are various methods that can be utilized to learn the parameters of a linear regression model. In one embodiment, a statistical learning process is performed by minimizing a cost function. A cost function is a measure of an error of the given model in terms of its ability to estimate a relationship between the independent variables x (e.g., the features) and the dependent variable y (e.g., the storage performance metrics). The cost function is typically expressed as a difference or distance between the predicted value ($y_{pred}$) and the actual value ($y_{true}$). The cost function can be estimated by iteratively running the model to compare estimated predictions of y ($y_{pred}$) against known values of y ($y_{true}$). The objective of a machine learning model, therefore, is to find parameters, weights or a structure that minimizes the cost function.

In one embodiment, a mean squared error (MSE) cost function is utilized which measures the average squared difference between the actual value y ($y_{true}$) value and the predicted value y ($y_{pred}$). In particular, MSE is determined as:

$$MSE = \frac{1}{N} \sum_{i=1}^{N} (y_{true} - y_{pred})^2$$

wherein N denotes the number of samples. The MSE computation results in a single value which represents the cost, or score, associated with a current set of weights. The goal is to minimize MSE value to improve the accuracy of the machine learning model.

When using a MSE cost function of an iterative linear model, an efficient optimization process, such as a gradient descent process, is utilized to determine a minimum of the cost function. The gradient descent process comprises a first-order iterative optimization algorithm which can be used to determine the minimum of a cost function. The gradient descent process enables a machine leaning model to learn how the model parameters should be adjusted to further reduce the cost function, e.g., reduce errors (differences between actual y and predicted y). As the machine learning model iterates, it gradually converges towards a minimum where further adjustments to the parameters produce little or zero changes in the error (e.g., convergence condition).

When using the MSE cost function as noted above, we are only considering the distance between the actual and the predicted values. In some embodiments, we would like to consider a portion of the distance from the actual value, which can increase the accuracy when using a metric that takes into account a relative distance. For example, consider storage latency metrics. For higher latency values, we allow the prediction to be at a larger distance from the actual value, while for lower latency values, we keep the prediction closer to the actual value. The following cost function (CF) takes into account such relative distances:

$$CF = \frac{\sum_{i=1}^{N} \left( \frac{(y_{pred} - y_{true})}{y_{true}} \right)^2}{2*N}$$

where N denotes the number of samples.

FIGS. 3A, 3B, and 3C illustrate model parameters of machine learning models for run-time determination of storage performance metrics, according to an embodiment of the invention. In particular, FIG. 3A illustrates a storage performance model ReadLatAvg 300 comprising a set of learned model parameters 302 for predicting performance scores with regard to average latency for read operations. FIG. 3A further illustrates a storage performance model ReadBW 310 comprising a set of learned model parameters 312 for predicting performance scores with regard to bandwidth for read operations. FIG. 3B illustrates a storage performance model WriteIOPS 320 comprising a set of learned model parameters 322 for predicting performance scores with regard to IOPS for write operations. FIG. 3B further illustrates a storage performance model WriteBW 330 comprising a set of learned model parameters 332 for predicting performance scores with regard to bandwidth of write operations. FIG. 3C illustrates a storage performance model ReadIOPS 340 comprising a set of learned model parameters 342 for predicting performance scores with regard to IOPS for read operations. FIG. 3C further illustrates a storage performance model WriteLatAvg 350 comprising a set of learned model parameters 352 for predicting performance scores with regard to average latency of write operations.

As shown in example embodiments of FIGS. 3A, 3B, and 3C, each set of learned model parameters 302, 312, 322, 332, 342, and 352 comprises ten (10) features and associated coefficients that are learned for the respective storage performance models 300, 310, 320, 330, 340, and 350 as a result of a machine learning process as discussed above. Each feature comprises a given KPI metric (e.g., a performance counter) and a summary statistic that specifies the statistical feature extraction operation that is performed on the time series telemetry data of the given KPI metric to generate the given feature. The features shown in FIGS. 3A, 3B, and 3C include KPI metrics that are obtained using various performance counters such as system performance counters, physical disk performance counters, logical disk performance counters, process performance counters, and cache performance counters.

For example, the system performance counters include:

(i) System\Context Switches/sec.—a system performance counter which indicates a combined rate at which all processors on the given computer system are switched from one thread to another (e.g., context switches occur when a running thread voluntarily relinquishes the processor, is preempted by a higher priority, ready thread, or switches between user-mode and privileged (kernel) mode, etc.);

(ii) System\System Calls/sec.—a system performance counter which indicates a combined rate of calls to operating system service routines by all processes running on the given computer system;

(iii) System\File Data Operations/sec.—a system performance counter which indicates a combined rate of read and write operations on all logical disks on the given computer system.

(iv) System\File Write Operations/sec.—a system performance counter which indicates a combined rate of file system write requests to all devices on the given computer system, including requests to write to data in the file system cache (measured in number of write operations per second);

(v) System\File Read Operations/sec.—a system performance counter which indicates a combined rate of file system read requests to all devices on the given computer system, including requests to read from the file system cache (measured in numbers of read operations per second);

(vi) System\File Write Bytes/sec.—a system performance counter which indicates an overall rate at which bytes are written to satisfy file system write requests to all devices on the given computer system, including write operations to the file system cache (measured in number of bytes per second); and (vii) System\File Read Bytes/sec.—a system performance counter which indicates an overall rate at which bytes are read to satisfy file system read requests to all devices on the given computer system, including read operations from the file system cache (measured in number of bytes per second).

The process performance counters monitor running application programs and system processes. For example, the process performance counters include:

(i) Process(X)\IO Read Bytes/sec.—a process performance counter which indicates a rate at which a given process (X) is reading bytes from I/O operations of all I/O activity generated by the process (e.g., file, network and device I/O);

(ii) Process(X)\IO Read Operations/sec.—a process performance counter which indicates a rate at which the given process (X) is issuing read I/O operations for all I/O activity generated by the process (e.g., file, network and device I/O);

(iii) Process(X)\IO Write Bytes/sec.—a process performance counter which indicates a rate the given process (X) is writing bytes to I/O operations for all I/O activity generated by the given process (e.g., file, network and device I/O);

(iv) Process (X)\IO Write Operations/sec.—a process performance counter which indicates a rate at which the given process (X) is issuing write I/O operations for all I/O activity generated by the given process (e.g., file, network and device I/O);

(v) Process(X)\IO Data Bytes/sec.—a process performance counter which indicates a rate at which the given process (X) is reading and writing bytes in I/O operations for all I/O activity generated by the given process (e.g., file, network and device I/O); and (vi) Process(X)\IO Data Operations/sec.—a process performance counter which indicates a rate at which the given process (X) is issuing read and write I/O operations for all I/O activity generated by the given process (e.g., file, network and device I/O).

The physical disk performance counters comprise counters that monitor physical drives (e.g., hard disk drives or solid-state drives) on a given computer system. The values of physical disk counters are sums of the values of the logical disks (or partitions) into which they are divided. For example, the physical disk performance counters include:

(i) PhysicalDisk(Total)\% Disk time—a physical disk performance counter which indicates a percentage of time that all physical disk drives of the given computer system are busy servicing read or write requests;

(ii) PhysicalDisk(Total)\Avg. Disk sec/Read—a physical disk performance counter which indicates an average time, in seconds, of all data reads from all physical disk drives of the given computer system;

(iii) PhysicalDisk(Total)\Avg. Disk sec/Transfer—a physical disk performance counter which indicates an average time, in seconds, of all disk transfers of all physical disk drives of the given computer system; and (iv) PhysicalDisk(_Total)\Avg. Disk sec/Write—a physical disk performance counter which indicates an average time, in seconds, of all data writes to all physical disk drives of the given computer system.

The logical disk performance counters comprises counters that monitor logical partitions (or logical disks) of hard disk drives or solid-state disk drives. For example, the logical disk performance counters include:

(i) LogicalDisk(_Total)\% Disk time—a logical disk performance counter which indicates a percentage of time that all logical disks of the given computer system are busy servicing read or write requests;

(ii) LogicalDisk(Total)\Avg. Disk sec/Read—a logical disk performance counter which indicates an average time, in seconds, of all data reads from all logical disks of the given computer system;

(iii) LogicalDisk(_Total)\Avg. Disk sec/Transfer—a logical disk performance counter which indicates an average time, in seconds, of all disk transfers of all logical disks of the given computer system; and (iv) LogicalDisk(_Total)\Avg. Disk sec/Write—a logical disk performance counter which indicates an average time, in seconds, of all data writes to all logical disks of the given computer system.

The cache performance counters comprise counters that monitor a file system cache. Since a cache is typically utilized by applications, the cache can be monitored as an indicator of application I/O operations. For example, the cache performance counters include Cache\Async Copy Reads/sec., which is a performance counter that indicates a rate at which read operations from pages of the file system cache involve a memory copy of the data from the cache to the application's buffer.

As noted above, each feature of the learned model parameters 302, 312, 322, 332, 342, and 352 shown in FIGS. 3A, 3B and 3C comprises a summary statistic (e.g., std, mean, max, 25%, 50%, 75%) that specifies the statistical feature extraction operation that is performed on the time series telemetry data that is collected for the given KPI metric associated with the given feature. For example, consider the set of learned model parameters 322 for the exemplary storage performance model WriteIOPS 320 shown in FIG. 3B. The model parameters 322 include a first model parameter P1 which comprises a feature System\File Data Operations/sec_75% and a corresponding coefficient of −02.3508 (e.g., weight). The value of this feature is computed as the $75^{th}$ percentile of a time series telemetry data stream of performance counter values for the System\File Data Operations/sec. metric as noted above, which are captured over a period of time (e.g., data samples captured every 2 seconds in a period of 10 minutes). The model parameter P1 is determined by multiplying the determined value of the feature System\File Data Operations/sec_75% by the corresponding coefficient of −02.3508.

In one exemplary embodiment, the set of learned model parameters 302, 312, 322, 332, 342, and 352 shown in FIGS. 3A, 3B and 3C are utilized to establish a set of linear formulas that that are used to compute storage performance scores for various storage metrics (e.g., IOPS, bandwidth, latency) for read and write operations. In one embodiment, the performance score for a given storage performance metric is computed by adding the model parameter values (e.g., P1+P2+P3+P4+P5+P6+P7+P8+P9+P10) for the corresponding learned model. For example, based on the set of model parameters 322 for the storage performance model WriteIOPS 320 shown in FIG. 3B, a formula for predicting a run-time IOPS performance score for write operations of a given application is as follows:

$$\begin{aligned}WriteIOPS = \\ [\text{Percentile75 (System\textbackslash File Data Operations/sec)} * -0.23507] + \\ [\text{Percentile25 (System\textbackslash File Data Operations/sec)} * 0.110803] + \\ [\text{Percentile50 (System\textbackslash File Data Operations/sec)} * 0.060986] + \\ [\text{Percentile25 (System\textbackslash System Calls/sec)} * 0.031604] + \\ [\text{Mean (System\textbackslash File Write Operations/sec)} * 1.131512] + \\ [\text{Mean (Process}(X)\text{\textbackslash IO Data Operations/sec)} * \\ -0.05654] + [\text{Percentile75} \\ (\text{Process}(X)\text{\textbackslash IO Data Operations/sec}) * \\ 0.288518] + [\text{Percentile25 (Process}(X)\text{\textbackslash IO} \\ \text{Data Operations/sec}) * -0.20186] + \\ [\text{Percentile50 (System\textbackslash System Calls/sec)} * \\ -0.03234] + [\text{Mean (System\textbackslash File} \\ \text{Data Operations/sec}) * -0.09694]\end{aligned}$$

Figure 4:
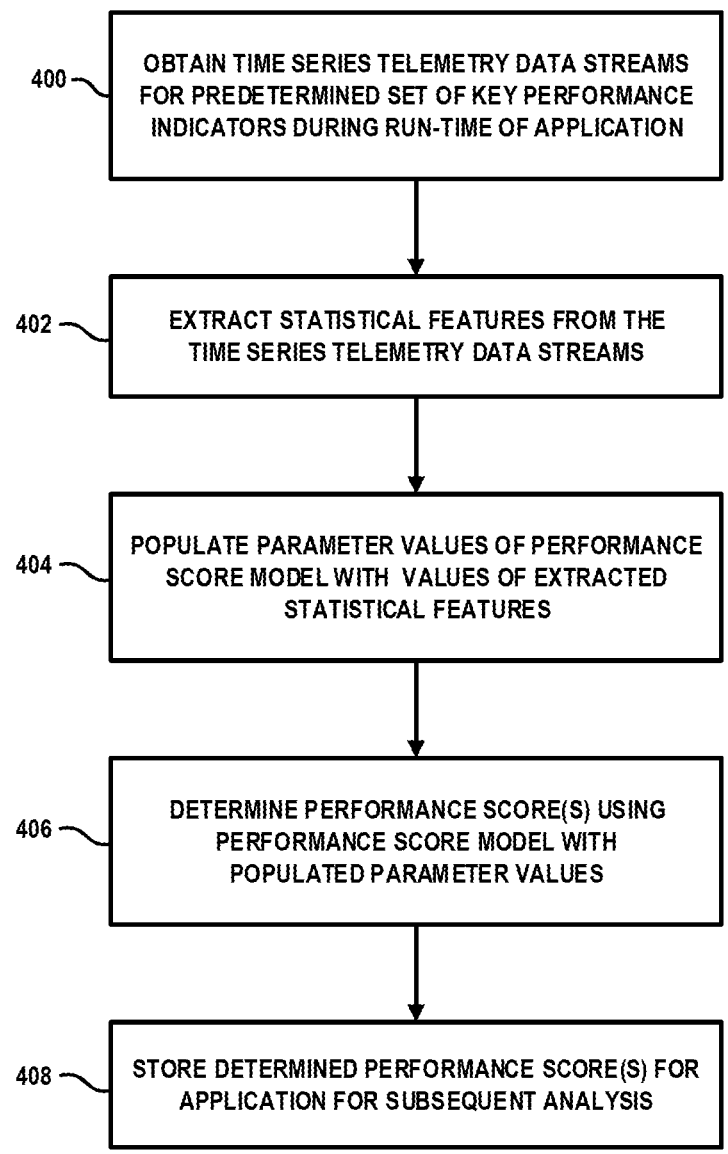
FIG. 4 is a flow diagram of a method for run-time determination of storage performance metrics of a given application, according to an embodiment of the invention.

FIG. 4 is a flow diagram of a method for run-time determination of storage performance metrics of a given application, according to an embodiment of the invention. In particular, in one exemplary embodiment, FIG. 4 illustrates operations that are implemented by the performance score determination module 160 of FIG. 1 during run-time execution of a given application on the computing system 140. In particular, during run-time execution of the given application, the performance score determination module 160 will obtain time series telemetry data streams for a predetermined set of KPIs (block 400). As noted above, the predetermined set of KPI includes KPIs which correspond to model parameters of the machine learning performance score model that is being utilized to determine run-time performance scores for the given application.

Next, the telemetry data feature extraction module 162 will extract one or more statistical features from each KPI time series telemetry data stream (block 402). For example, as noted above, in one embodiment, the statistical features are extracted by computing one or more summary statistics from the time series telemetry data stream including, for example, mean, standard deviation, Min, Max, $25^{th}$ percentile, $50^{th}$ percentile, and $75^{th}$ percentile. Again, the types of KPI data streams and summary statistics that are utilized to determine performance scores for the given application will vary depending on the model parameters of the trained performance score model that is being utilized to compute the performance scores. The amount of time series telemetry data that is used to compute a given summary statistic will vary depending on the application. For example, in an exemplary embodiment where telemetry data samples are collected every 2 seconds, the feature extraction process can be applied about every 10 minutes of recorded data samples for each of the KPI telemetry data streams.

The performance score determination module 160 will then populate the parameter values of the performance score model with the values of the extracted features (block 404). In particular, as discussed above and as illustrated in FIGS. 3A, 3B and 3C, each storage performance model 300, 310, 320, 330, 340 and 350 comprises a respective set of learned model parameters 302, 312, 322, 332, 342, and 352, wherein each model parameter P comprises a feature which corresponds to a KPI metric and the statistical feature extraction operation (e.g., summary statistic) that is performed on the time series telemetry data of the KPI metric (e.g., std, mean, max, 25%, 50%, 75%) to derive the feature value. In the exemplary embodiment, the parameter values of the storage performance models 300, 310, 320, 330, 340 and 350 are populated with the extracted feature values specified by the model parameters.

Next, the performance score determination module 160 will determine one or more performance scores using the performance score model(s) with the parameters populated with the values of the extracted features (block 406). For example, in one embodiment as discussed above, the performance score for a given storage performance metric is computed by adding the model parameter values (e.g., P1+P2+P3+P4+P5+P6+P7+P8+P9+P10) for the corresponding learned model. The parameter value for a given model parameter is determined by multiplying the extracted feature value by the learned coefficient (e.g., weight) for that model parameter.

The performance score determination module 160 will store the determined performance scores for the given application in a persistent storage (e.g., database of performance scores 166, FIG. 1) for subsequent use and analysis by, e.g., the performance score and system configuration analysis module 170 as discussed above (block 408). In the context of run-time storage performance of a given application, the performance score determination module 160 can utilize the storage performance models 300, 310, 320, 330, 340 and 350 shown in FIGS. 3A-3C to determine performance scores for average latency for read operations, bandwidth for read operations, IOPS for write operations, bandwidth of write operations, IOPS for read operations, and average latency of write operations. These storage performance scores can be periodically determined during run-time operation of the application (e.g., every 10 minutes) over the course of a few hours, days, etc., and persistently stored in a data structure which maps the performance scores to a given configuration of the computing system. The overall performance score for a given storage performance metric can be determined from an average of all the performance scores determined for the given storage performance metric over a given period of time (e.g., hours).

It is to be appreciated that exemplary systems and methods as described herein allow for determining the run-time performance of an application executing on a computing system with low impact on the performance of the computing system. For example, the techniques disclosed herein eliminate the need for end-users to execute custom designed benchmark applications on their machines to determine the run-time performance of applications. Such custom designed benchmark applications prevent users from actually using the applications during benchmark application testing, and the execution of the benchmark application adds additional workloads which stresses the machine in a way that can adversely impact the performance of other processes or applications that the end user is currently executing on the given machine.

Furthermore, the performance score models that are used to compute run-time performance scores comprise lightweight, agnostic statistical models that are trained to predict performance scores for a wide variety of applications and over a wide variety of system configurations and architectures. The performance score models as described herein are generalizable, as such models simply use telemetry data of a running application in order to determine and report performance scores. No tasks and no loads are needed that are custom tailored to the application, thereby allowing the performance score models to be utilized for any unknown application. Furthermore, during run-time operation, not all available KPIs need to be recorded and analyzed, as each performance score model utilizes a much smaller subset of the available run-time KPI telemetry data streams (e.g., 10 to 30 KPIs) to compute run-time performance scores for applications executing on a given computing system. Moreover, the techniques for determining performance scores using pre-trained statistical models provide lightweight solutions for determining run-time performance scores without impacting machine performance.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method, comprising:
performing, by a system configuration tool executing on a computing system, an automated process to determine a run-time performance of an application executing on the computing system;
wherein performing the automated process comprises:
obtaining a time series telemetry data stream for each of a plurality of key performance indicators corresponding to utilization of resources of the computing system by the application during run-time execution of the application on the computing system with the computing system having a first system configuration;
populating model parameters of a trained machine learning performance score model with parameter values that are determined based on the obtained time series telemetry data streams, wherein at least one model parameter comprises a learned weight value, and a learned feature which specifies (i) an associated key performance indicator, and (ii) an associated statistical feature extraction operation to perform on a time series telemetry data stream associated with the given key performance indicator to compute a value for the learned feature, wherein a parameter value of the at least one model parameter is computed by applying the associated statistical feature extraction operation to at least a portion of the obtained time series telemetry data stream associated with the given key performance indicator to determine the value of the learned feature, and applying the learned weight value to the determined value of the learned feature;
determining a run-time performance score of the application using the model parameters of the trained machine learning performance score model populated with the parameter values based on the obtained time series telemetry data streams; and
in response to the determined run-time performance score of the application, automatically determining whether to one of: (i) maintain the first system configuration and (ii) adjust at least one resource configuration setting of the computing system to alter a run-time performance of the application, based on the determined run-time performance score of the application;
wherein the trained machine learning performance score model comprises one or more storage performance models in which model parameters of the one or more storage performance models are trained to determine one or more storage performance metrics.

2. The method of claim 1, wherein the automated process further comprises persistently storing the determined run-time performance score of the application in a data structure that maps the determined run-time performance score to information regarding the first system configuration of the computing system.

3. The method of claim 1, wherein the trained machine learning performance score model comprises an application agnostic and system configuration agnostic machine learning performance score model, and wherein the one or more storage performance metrics comprise one or more of: (i) average latency for read operations; (ii) average latency of write operations; (iii) bandwidth for read operations; (iv) bandwidth of write operations; (v) input/output operations per second for write operations; and (vi) input/output operations per second for read operations.

4. The method of claim 1, wherein applying the associated statistical feature extraction operation to at least a portion of the obtained time series telemetry data stream associated with the given key performance indicator, comprises:

computing summary statistics on telemetry data sample values of the obtained time series telemetry data stream associated with the given key performance indicator;
wherein the summary statistics comprise one or more of: (i) mean; (ii) standard deviation; (iii) minimum; (iv) maximum; (v) $25^{th}$ percentile; (vi) $50^{th}$ percentile; and (vii) $75^{th}$ percentile.

5. The method of claim 1, wherein determining the run-time performance score of the application using the model parameters of the trained machine learning performance score model populated with the parameter values based on the obtained time series telemetry data streams, comprises:
computing a parameter value for each model parameter of the trained machine learning performance score model; and
determining a sum of the computed parameter values of the model parameters of the trained machine learning performance score model;
wherein the determined sum corresponds to a performance score for a given storage performance metric defined by the trained machine learning performance score model.

6. The method of claim 1, wherein the time series telemetry data streams for the plurality of key performance indicators are obtained using one or more of performance counters that execute on the computing system, wherein the performance counters comprise one or more of: (i) system performance counters; (ii) physical disk performance counters; (iii) logical disk performance counters; (iv) process performance counters; and (v) cache performance counters.

7. The method of claim 1, wherein the automated process further comprises:
determining a second run-time performance score of the application using the model parameters of the trained machine learning performance score model populated with values of extracted statistical features obtained during run-time execution of the application on the computing system with the computing system having a second system configuration, which is different from the first system configuration; and
comparing the second run-time performance score with a previously determined run-time performance score of the application executing on the computing system having the first system configuration; and
determining which of the first and second system configurations of the computing system provide a greater run-time performance of the application based on said comparison of the run-time performance scores.

8. An article of manufacture comprising a non-transitory processor-readable storage medium having stored therein program code of one or more software programs, wherein the program code is executable by one or more processors to perform a method which comprises:
performing, by a system configuration tool executing on a computing system, an automated process to determine a run-time performance of an application executing on the computing system;
wherein performing the automated process comprises:
obtaining a time series telemetry data stream for each of a plurality of key performance indicators corresponding to utilization of resources of the computing system by the application during run-time execution of the application on the computing system with the computing system having a first system configuration;
populating model parameters of a trained machine learning performance score model with parameter values that are determined based on the obtained time series telemetry data streams, wherein at least one model parameter comprises a learned weight value, and a learned feature which specifies (i) an associated key performance indicator, and (ii) an associated statistical feature extraction operation to perform on a time series telemetry data stream associated with the given key performance indicator to compute a value for the learned feature, wherein a parameter value of the at least one model parameter is computed by applying the associated statistical feature extraction operation to at least a portion of the obtained time series telemetry data stream associated with the given key performance indicator to determine the value of the learned feature, and applying the learned weight value to the determined value of the learned feature;
determining a run-time performance score of the application using the model parameters of the trained machine learning performance score model populated with the parameter values based on the obtained time series telemetry data streams; and
in response to the determined run-time performance score of the application, automatically determining whether to one of: (i) maintain the first system configuration and (ii) adjust at least one resource configuration setting of the computing system to alter a run-time performance of the application, based on the determined run-time performance score of the application;
wherein the trained machine learning performance score model comprises one or more storage performance models in which model parameters of the one or more storage performance models are trained to determine one or more storage performance metrics.

9. The article of manufacture of claim 8, further comprising program code that is executable by the one or more processors to perform a method comprising persistently storing the determined run-time performance score of the application in a data structure that maps the determined run-time performance score to information regarding the first system configuration of the computing system.

10. The article of manufacture of claim 8, wherein the trained machine learning performance score model comprises an application agnostic and system configuration agnostic machine learning performance score model, and wherein the one or more storage performance metrics comprise one or more of: (i) average latency for read operations; (ii) average latency of write operations; (iii) bandwidth for read operations; (iv) bandwidth of write operations; (v) input/output operations per second for write operations; and (vi) input/output operations per second for read operations.

11. The article of manufacture of claim 8, wherein the program code for applying the associated statistical feature extraction operation to at least a portion of the obtained time series telemetry data stream associated with the given key performance indicator, comprises program code for:
computing summary statistics on telemetry data sample values of the obtained time series telemetry data stream associated with the given key performance indicator;
wherein the summary statistics comprise one or more of: (i) mean; (ii) standard deviation; (iii) minimum; (iv) maximum; (v) $25^{th}$ percentile; (vi) $50^{th}$ percentile; and (vii) $75^{th}$ percentile.

12. The article of manufacture of claim 8, wherein the program code for determining the run-time performance score of the application using the model parameters of the trained machine learning performance score model populated with the parameter values based on the obtained time series telemetry data streams, comprises program code for:
  computing a parameter value for each model parameter of the trained machine learning performance score model; and
  determining a sum of the computed parameter values of the model parameters of the trained machine learning performance score model;
  wherein the determined sum corresponds to a performance score for a given storage performance metric defined by the trained machine learning performance score model.

13. The article of manufacture of claim 8, wherein the time series telemetry data streams for the plurality of key performance indicators are obtained using one or more of performance counters that execute on the computing system, wherein the performance counters comprise one or more of: (i) system performance counters; (ii) physical disk performance counters; (iii) logical disk performance counters; (iv) process performance counters; and (v) cache performance counters.

14. A computing system, comprising:
  memory to store software instructions;
  one or more processors that execute the software instructions to instantiate a system configuration tool which is configured to perform an automated process to determine a run-time performance of an application executing on the computing system, wherein the automated process comprises:
    obtaining a time series telemetry data stream for each of a plurality of key performance indicators corresponding to utilization of resources of the computing system by the application during run-time execution of the application on the computing system with the computing system having a first system configuration;
    populating model parameters of a trained machine learning performance score model with parameter values that are determined based on the obtained time series telemetry data streams, wherein at least one model parameter comprises a learned weight value, and a learned feature which specifies (i) an associated key performance indicator, and (ii) an associated statistical feature extraction operation to perform on a time series telemetry data stream associated with the given key performance indicator to compute a value for the learned feature, wherein a parameter value of the at least one model parameter is computed by applying the associated statistical feature extraction operation to at least a portion of the obtained time series telemetry data stream associated with the given key performance indicator to determine the value of the learned feature, and applying the learned weight value to the determined value of the learned feature;
    determining a run-time performance score of the application using the model parameters of the trained machine learning performance score model populated with the parameter values based on the obtained time series telemetry data streams; and
    in response to the determined run-time performance score of the application, automatically determining whether to one of: (i) maintain the first system configuration and (ii) adjust at least one resource configuration setting of the computing system to alter a run-time performance of the application, based on the determined run-time performance score of the application;
  wherein the trained machine learning performance score model comprises one or more storage performance models in which model parameters of the one or more storage performance models are trained to determine one or more storage performance metrics.

15. The computing system of claim 14, wherein the trained machine learning performance score model comprises an application agnostic and system configuration agnostic machine learning performance score model, and wherein the one or more storage performance metrics comprise one or more of: (i) average latency for read operations; (ii) average latency of write operations; (iii) bandwidth for read operations; (iv) bandwidth of write operations; (v) input/output operations per second for write operations; and (vi) input/output operations per second for read operations.

16. The computing system of claim 14, wherein applying the associated statistical feature extraction operation to at least a portion of the obtained time series telemetry data stream associated with the given key performance indicator, comprises:
  computing summary statistics on telemetry data sample values of the obtained time series telemetry data stream associated with the given key performance indicator;
  wherein the summary statistics comprise one or more of: (i) mean; (ii) standard deviation; (iii) minimum; (iv) maximum; (v) $25^{th}$ percentile; (vi) $50^{th}$ percentile; and (vii) $75^{th}$ percentile.

17. The computing system of claim 14, determining the run-time performance score of the application using the model parameters of the trained machine learning performance score model populated with the parameter values based on the obtained time series telemetry data streams, comprises:
  computing a parameter value for each model parameter of the trained machine learning performance score model; and
  determining a sum of the computed parameter values of the model parameters of the trained machine learning performance score model;
  wherein the determined sum corresponds to a performance score for a given storage performance metric defined by the trained machine learning performance score model.

18. The computing system of claim 14, wherein the time series telemetry data streams for the plurality of key performance indicators are obtained using one or more of performance counters that execute on the computing system, wherein the performance counters comprise one or more of: (i) system performance counters; (ii) physical disk performance counters; (iii) logical disk performance counters; (iv) process performance counters; and (v) cache performance counters.

19. The computing system of claim 14, wherein the automated process further comprises:
  determining a second run-time performance score of the application using the model parameters of the trained machine learning performance score model populated with values of extracted statistical features obtained during run-time execution of the application on the computing system with the computing system having a second system configuration, which is different from the first system configuration; and comparing the second run-time performance score with a previously determined run-time performance score of the application executing on the computing system having the first system configuration; and determining which of the first and second system configurations of the computing system provide a greater run-time performance of the application based on said comparison of the run-time performance scores.

\* \* \* \* \*